United States Patent
Ueki et al.

(10) Patent No.: US 9,673,436 B2
(45) Date of Patent: Jun. 6, 2017

(54) NONAQUEOUS ELECTROLYTE SECONDARY BATTERY

(75) Inventors: Tomoyoshi Ueki, Toyota (JP); Yusuke Fukumoto, Moriguchi (JP); Harunari Shimamura, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/357,580

(22) PCT Filed: Nov. 15, 2011

(86) PCT No.: PCT/JP2011/076326
§ 371 (c)(1),
(2), (4) Date: May 13, 2014

(87) PCT Pub. No.: WO2013/073011
PCT Pub. Date: May 23, 2013

(65) Prior Publication Data
US 2014/0272534 A1    Sep. 18, 2014

(51) Int. Cl.
*H01M 2/14*     (2006.01)
*H01M 2/16*     (2006.01)
(Continued)

(52) U.S. Cl.
CPC ......... *H01M 2/1686* (2013.01); *H01M 2/166* (2013.01); *H01M 2/1646* (2013.01);
(Continued)

(58) Field of Classification Search
CPC .. H01M 2/1686; H01M 2/1673; H01M 2/166; H01M 10/4235; H01M 2/1646; H01M 10/052
See application file for complete search history.

(56) References Cited

U.S. PATENT DOCUMENTS

2005/0221172 A1* 10/2005 Kato et al. ............... 429/144
2006/0105245 A1*  5/2006 Ikuta ................... H01M 2/164
                                                                429/246
(Continued)

FOREIGN PATENT DOCUMENTS

CN          101331643 A      12/2008
CN          101657497         2/2010
(Continued)

*Primary Examiner* — Cynthia K Walls
(74) *Attorney, Agent, or Firm* — Finnegan, Henderson, Farabow, Garrett & Dunner, LLP

(57) ABSTRACT

The nonaqueous electrolyte secondary battery of the present invention has a positive electrode, a negative electrode, a separator interposed between the positive electrode and the negative electrode, and a nonaqueous electrolyte solution. The battery further has a porous heat-resistant layer provided between the separator and at least one of the positive electrode and the negative electrode, wherein the porous heat-resistant layer includes an inorganic filler and a binder. The inorganic filler included in the porous heat-resistant layer has a particle size distribution with two peaks, which are a first peak (P1) at a relatively small particle diameter and a second peak (P2) at a relatively large particle diameter. When the particle diameter of the first peak (P1) is D1 be and the particle diameter of the second peak (P2) is D2 being, the peak particle diameter ratio D1/D2 satisfies the condition $0.2 \leq D1/D2 \leq 0.7$.

5 Claims, 11 Drawing Sheets

(51) Int. Cl.
*H01M 10/42* (2006.01)
*H01M 10/052* (2010.01)

(52) U.S. Cl.
CPC ..... *H01M 2/1673* (2013.01); *H01M 10/4235* (2013.01); *H01M 10/052* (2013.01)

(56) References Cited

U.S. PATENT DOCUMENTS

| | | |
|---|---|---|
| 2006/0194116 A1 | 8/2006 | Suzuki et al. |
| 2006/0251963 A1* | 11/2006 | Nakashima et al. .......... 429/144 |
| 2008/0038631 A1* | 2/2008 | Nakura et al. ................ 429/144 |
| 2009/0246613 A1 | 10/2009 | Park et al. |
| 2009/0325074 A1 | 12/2009 | Fukumoto et al. |
| 2010/0068612 A1 | 3/2010 | Nishikawa |
| 2010/0092754 A1 | 4/2010 | Nishida et al. |
| 2011/0052987 A1* | 3/2011 | Katayama ........... H01M 2/1646 429/221 |

FOREIGN PATENT DOCUMENTS

| | | |
|---|---|---|
| JP | 2005-235695 | 9/2005 |
| JP | 2008-27634 A | 2/2008 |
| JP | 2008-300362 | 12/2008 |
| JP | 2009-143060 A | 7/2009 |
| JP | 2009-283273 | 12/2009 |
| JP | 2010-123383 | 6/2010 |
| JP | 2010-520095 A | 6/2010 |
| JP | 4602254 B | 12/2010 |
| JP | 201123186 A | 2/2011 |
| WO | WO 2005/029614 A1 | 3/2005 |

\* cited by examiner

NONAQUEOUS ELECTROLYTE SECONDARY BATTERY

CROSS-REFERENCE TO RELATED APPLICATIONS

This application is a national phase application of International Application No. PCT/JP2011/076326, filed Nov. 15, 2011, the content of which is incorporated herein by reference.

TECHNICAL FIELD

The present invention relates to a secondary battery containing a nonaqueous electrolyte solution, and more particularly to a nonaqueous electrolyte secondary battery having a porous heat-resistant layer between an electrode and a separator.

BACKGROUND ART

In recent years, lithium secondary batteries, nickel hydride batteries and other secondary batteries (storage cells) have been growing in importance as on-board power sources for vehicles and as power sources for personal computers and handheld devices. Lithium secondary batteries, which are lightweight and provide a high energy density, are advantageously used as high-power on-board energy sources for vehicles. In a typical construction, this type of lithium secondary battery has a positive electrode, a negative electrode, and a porous separator between the positive electrode and the negative electrode. The separator prevents short circuits due to contact between the positive electrode and the negative electrode. In addition, by allowing an electrolyte to be impregnated into pores therein, the separator also serves to form ion-conducting paths between both electrodes.

The separators used up until now have been porous resin sheets composed of, for example, polyethylene (PE) or polypropylene (PP). Because such separators are porous, heat shrinkage arises at elevated temperatures. This effect is used to actuate a shutdown function. However, if the degree of thermal shrinkage is large, localized shorting due to film breakage or the like may arise, and shorting may spread further from this point. To prevent heat shrinkage of the separator, the formation of a porous heat-resistant layer on the separator surface has been disclosed (see, for example, Patent Literature 1). The formation of a porous heat-resistant layer at the surface of an electrode (the positive electrode and/or the negative electrode) in order to keep the positive electrode and the negative electrode from coming into direct mutual contact when heat shrinkage of the separator occurs has also been investigated,

CITATION LIST

Patent Literature

Patent Literature 1: Japanese Patent Application Laid-open No, 2008-300362

SUMMARY OF INVENTION

There exists a desire that lithium secondary batteries intended for use as a power source in a vehicle (e.g., lithium secondary batteries installed in a hybrid vehicle which uses lithium secondary batteries as a power source in combination with another power source having a different principle of operation—such as an internal combustion engine, or installed in an electric car) have a high power output as a source of electricity for driving the vehicle. In a lithium secondary battery having a porous heat-resistant layer formed on the surface of the separator or an electrode, increasing the ion permeability of the porous heat-resistant layer is important for achieving a higher battery power. For the battery to achieve a higher power, it is desirable that the porous heat-resistant layer have a large porosity. Patent Literature 1 mentions setting the porous heat-resistant layer to a porosity of from 40% to 60%.

However, it may not be enough to merely increase the porosity in the manner of Patent Literature 1. Depending on the size of the pores included in the porous heat-resistance layer and the manner in which those pores meander (their "tortuosity"), the electrolyte solution may have difficulty impregnating the porous heat-resistant layer and it may not be possible to sufficiently secure flow channels for passage of the ions, which may lead to a decline in the high-rate characteristics (e.g., a rise in IV resistance following a high-rate durability test).

Accordingly, the primary object of this invention, which was arrived at in light of the above, is to provide a nonaqueous electrolyte secondary battery which has a porous heat-resistant layer endowed with a good ion permeability and in which improved high-rate characteristics have been achieved.

The nonaqueous electrolyte secondary battery provided by this invention has a positive electrode, a negative electrode, a separator interposed between the positive electrode and the negative electrode, and a nonaqueous electrolyte solution. The battery further has a porous heat-resistant layer disposed between the separator and at least one of the positive electrode and the negative electrode, wherein the porous heat-resistant layer includes an inorganic filler (in powder form) and a binder. The inorganic filler included in the porous heat-resistant layer has a particle size distribution (which refers, here and below, to volume-basis measured values obtained by a laser diffraction/scattering method) with two peaks, which are a first peak at a relatively small particle diameter and a second peak at a relatively large particle diameter. When the particle diameter of the first peak is D1 and the particle diameter of the second peak is D2, the peak particle diameter ratio (D1/D2) satisfies the condition $0.2 \leq D1/D2 \leq 0.7$. The inorganic filler included in the porous heat-resistant layer preferably has a maximum particle diameter of 5 µm or less.

In this nonaqueous electrolyte secondary battery, two peaks are present in the particle size distribution of the inorganic filler included in the porous heat-resistant layer, and the particle diameter ratio between the peaks (D1/D2) is in the range of 0.2 to 0.7. In this arrangement, fiber particles having a large particle diameter and filler particles having a small particle diameter are randomly packing, so that the gaps between the filler particles become larger than gaps obtained between monodispersed particles and take on shapes suitable for impregnation of the nonaqueous electrolyte solution. As a result, the ion permeability of the porous heat-resistant layer dramatically increases, enabling a nonaqueous electrolyte secondary battery having excellent high-rate characteristics (e.g., little rise in resistance following high-rate durability testing) to be obtained.

The inorganic filler (in powder form) disclosed herein has a peak particle diameter ratio (D1/D2) which preferably satisfies the condition $D1/D2 \leq 0.7$, more preferably satisfies the condition $D1/D2 \leq 0.6$, and most preferably satisfies the condition D1/D2≤0.5. Within such a range in the peak particle diameter ratio (D1/D2), a porous heat-resistant layer of a suitable porosity that is easily impregnated by the nonaqueous electrolyte solution can be provided, as a result of which there can be obtained a nonaqueous electrolyte secondary battery endowed with excellent high-rate characteristics. However, if the particle size ratio D1/D2 is too small, filler particles of small particle diameter (fine particles) fill gaps between filler particles of large particle diameter (coarse particles), which may reduce the diameter of gaps (pores) between the particles and thus narrow the flow channels for passage of the ions (increasing, in turn, the resistance following high-rate durability testing in secondary batteries built using such a porous heat resistant layer). From the standpoint of forming broad flow channels tier the passage of ions, the particle size ratio more preferably satisfies the condition 0.2≤D1/D2, and most preferably satisfies the condition 0.3≤D1/D2.

It is preferable fir the peak diameter D1 of the first peak in the above particle size distribution of the inorganic filler to be from about 0.2 μm to about 0.9 μm (more preferably from 0.2 μm to 0.75 μm, and even more preferably from 0.2 μm to 0.5 μm). Also, it is preferable for the peak diameter D2 of the second peak in the above particle size distribution of the inorganic filler to be from about 1 μm to about 2 μm (more preferably from 1.2 μm to 2 μm, and even more preferably from 1.5μ to 1.9 μm). The ion permeability of the porous heat-resistant layer can thus be further improved, enabling a higher power output and increased durability to be satisfactorily achieved.

In one preferred embodiment of the nonaqueous electrolyte secondary battery disclosed herein, letting F1 (%) be a frequency of the first peak and F2 (%) be a frequency of the second peak, the peak frequency ratio F1/F2 satisfies the condition 0.4≤F1/F2≤1.0 (and preferably satisfies the condition 0.4≤F1/F2≤0.7). This arrangement provides a suitable balance in the ratio between filler particles of large particle diameter (coarse particles) and filler particles of a small particle diameter (fine particles), enabling the above-described effects to be more suitably exhibited. For example, nonaqueous electrolyte secondary batteries in which the rise in resistance is low even with charge-discharge cycling (particularly charge-discharge cycling that includes high-rate discharge) can be built.

In another preferred embodiment of the nonaqueous electrolyte secondary battery disclosed herein, the porous heat-resistant layer is formed on a surface of the separator situated on a side thereof facing the negative electrode. This arrangement enables a higher performance to be stably achieved.

In yet another preferred embodiment of the nonaqueous electrolyte secondary battery disclosed herein, the porous heat-resistant layer has a porosity of 50% to 70%. According to this invention, because the inorganic filler included in the porous heat-resistant layer has a particle size distribution with two peaks therein and, moreover, the particle diameter ratio (D1/D2) between the two peaks is in the range of 0.2 to 0.7, a porous heat-resistant layer having a high porosity can easily be obtained.

The material of the inorganic filler is not particularly limited, and may be at least one type of inorganic compound selected from the group consisting of alumina, magnesia, zirconia, silica, boehmite and titania. These inorganic compounds can be advantageously used as inorganic fillers suitable for the object of the invention because they are high-melting and have an excellent heat resistance.

Owing to their excellent high-rate characteristics and good durability and other qualities, any of the nonaqueous electrolyte secondary batteries disclosed herein are suitable as nonaqueous electrolyte secondary batteries (e.g., lithium secondary batteries) for on-board use in vehicles such as automobiles. This invention thus makes it possible to provide vehicles (e.g., automobiles) in which nonaqueous electrolyte secondary batteries (which may be in the form of a battery pack composed of a plurality of connected nonaqueous electrolyte secondary batteries) are installed as a source of power (typically, a source of power in a hybrid vehicle or an electric vehicle).

DESCRIPTION OF EMBODIMENTS

Embodiments of the invention are described below in conjunction with the attached diagrams, in which members or features having like functions are denoted by like symbols. Dimensions (length, width, depth, etc.) in the respective drawings do not reflect actual dimensions, Note that technical matters which are required for carrying out the present invention but are not particularly mentioned in the present Description (e.g., methods of manufacturing positive electrode active materials and negative electrode active materials, the construction of and methods of manufacturing separators and electrolytes, the general art relating to the building of nonaqueous electrolyte secondary batteries and other batteries) are matters of design variation that could be apprehended by those skilled in the art based on prior art.

Figure 1:
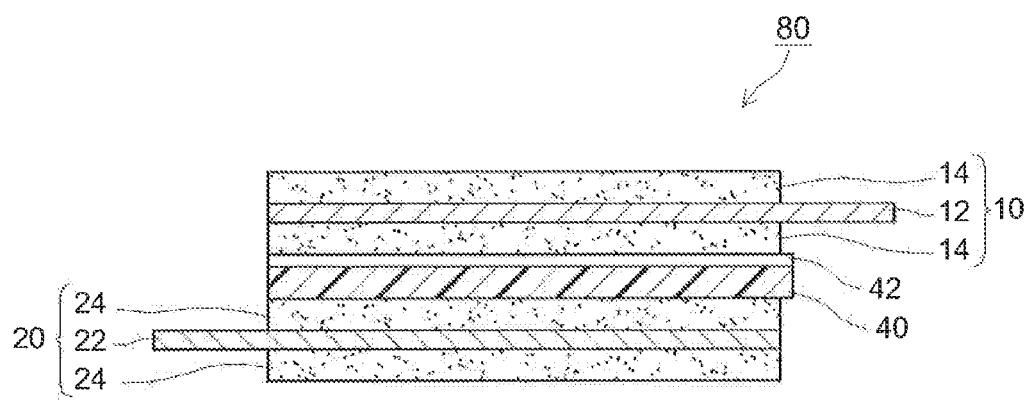
FIG. 1 is a cross-sectional diagram schematically showing the essential features of a coiled electrode assembly used in an embodiment of the invention.
Figure 2:
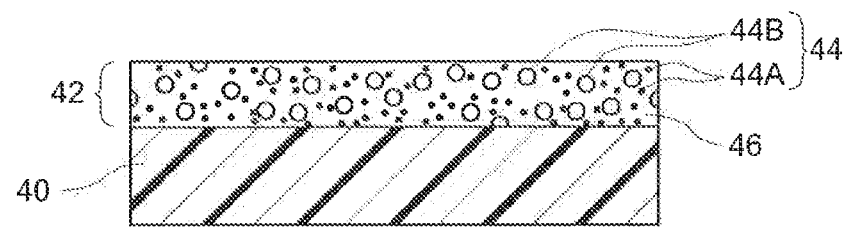
FIG. 2 is a cross-sectional diagram schematically showing a separator and a porous heat-resistant layer used in an embodiment of the invention.

In the embodiment described below, the battery separator according to the invention is employed as a separator in a lithium secondary battery serving as an example of a nonaqueous electrolyte secondary battery, although the application of the invention is not intended to be limited to lithium secondary batteries. Essential features of the lithium secondary battery according to this embodiment are shown in FIGS. 1 and 2. FIG. 1 is a schematic cross-sectional enlarged view showing part of the cross-section obtained by cutting a coiled electrode assembly 80 used in the lithium secondary battery in a radial direction (stacking direction of the positive and negative electrode sheets and the separator). FIG. 2 is a cross-sectional view schematically Showing a separator 40 used in this embodiment and a porous heat-resistant layer 42 formed on the separator 40.

As shown schematically in FIG. 1, the lithium secondary battery according to this embodiment has an electrode assembly 80 with a structure in which a positive electrode 20 and a negative electrode 10 are stacked with a separator 40 interposed therebetween. As in a typical lithium secondary battery, the electrode assembly 80 is constructed so as to include certain constituent battery materials (including respective active materials for the positive and negative electrodes, respective current collectors for the positive and negative electrodes, and a separator). In this embodiment, the positive electrode 20 has a positive electrode current collector (here made of aluminum) 22, and positive electrode active material-containing positive electrode active material layers 24 formed on both sides of the positive electrode current collector. The negative electrode 10 has a negative electrode current collector (here made of copper) 12, and negative electrode active material-containing negative electrode active material layers 14 formed on both sides of the negative electrode current collector.

<Porous Heat-Resistant Layer>

The lithium secondary battery used in this embodiment additionally has a porous heat-resistant layer 42 disposed between the separator 40 and at least one electrode from among the positive electrode 20 and the negative electrode 10. In this embodiment, the porous heat-resistant layer 42 is formed on one surface of the separator 40, and specifically on the surface situated on the side facing the negative electrode 10. In this embodiment, the porous heat-resistant layer 42 is formed in, of the separator 40, a range encompassing at least the region facing the negative electrode active material layer 14 of the negative electrode 10.

The porous heat-resistant layer 42, as shown schematically in FIG. 2, contains an inorganic filler (in power form) 44 and a binder 46. The porous heat-resistant layer 42 serves the function of preventing thermal shrinks in the separator 40 and keeping the positive electrode 20 and the negative electrode 10 from coming into direct contact when the separator 40 incurs thermal shrinkage during overcharging. In the porous heat-resistant layer 42, the binder 46 anchors filler particles 44 to the surface of the separator 40 and binds filler particles 44 to each other. Between the filler particles 44, numerous gaps are formed at sites not bonded by the binder 46. By having the nonaqueous electrolyte solution impregnate these gaps, the movement of lithium ions between the positive electrode 20 and the negative electrode 10 is ensured and sufficient battery power is achieved.

<Inorganic Filler>

The material making up the filler particles 44 is preferably an inorganic material having high electrical insulating properties. An inorganic material having a higher melting point than the separator 40 is preferred. Such an inorganic material may be used in one, two or more types without particular limitation. Illustrative examples include such inorganic materials (inorganic compounds) as alumina, boehmite, magnesia, titania, silica, zirconia, zinc oxide, iron oxide, ceria and yttria. Examples of especially preferred inorganic materials include alumina, boehmite, magnesia and titania. These inorganic materials may be used alone as one type only or two or more may be used in combination.

<Particle Size Distribution>

Figure 3:
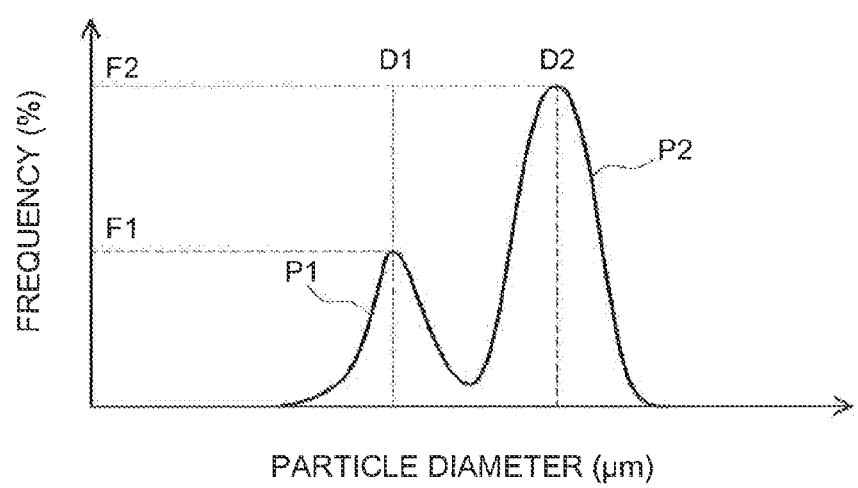
FIG. 3 is a graph illustrating the particle size distribution of an inorganic filler.

The filler particles 44 used in the lithium secondary battery disclosed herein have, as shown in FIG. 3, two peaks in a particle size frequency distribution obtained by a laser diffraction/scattering method (referred to below as "particle size distribution"): a first peak P1 at a relatively small particle diameter and a second peak P2 at a relatively large particle diameter. Letting D1 be the particle diameter of the first peak P1(maximum frequency particle diameter in first peak) and D2 be the particle diameter of the second peak P2 (maximum frequency particle diameter in second peak), the peak particle diameter ratio D1/D2 satisfies the condition $0.2 \leq D1/D2 \leq 0.7$, and preferably satisfies the condition $0.2 \leq D1/D2 \leq 0.5$.

The filler particles 44 used in the lithium secondary battery disclosed herein must have two peaks in the particle size frequency distribution obtained by the laser diffraction/scattering method, although powders having three or more peaks are also encompassed by the invention, provided that, in cases where the filler particles have three or more peaks, any two of those peaks satisfies the above particle diameter ratio (D1/D2) range. It is thought that, with the use of filler particles 44 having two peaks present in the particle size distribution and for which the ratio D1/D2 between the peak particle diameters is in the range of 0.2 to 0.7, the gaps obtained between the filler particles 44 become larger than the gaps obtained between monodispersed particles (particles having a single peak) and assume shapes suitable for impregnating a nonaqueous electrolyte solution (e.g., shapes with little meandering of the pores). Hence, the ion permeability of the porous heat-resistant layer 42 markedly increases, enabling a lithium secondary battery of excellent high-rate characteristics to be obtained (e.g., the rise in resistance Billowing high-rate durability testing is small).

Figure 4:
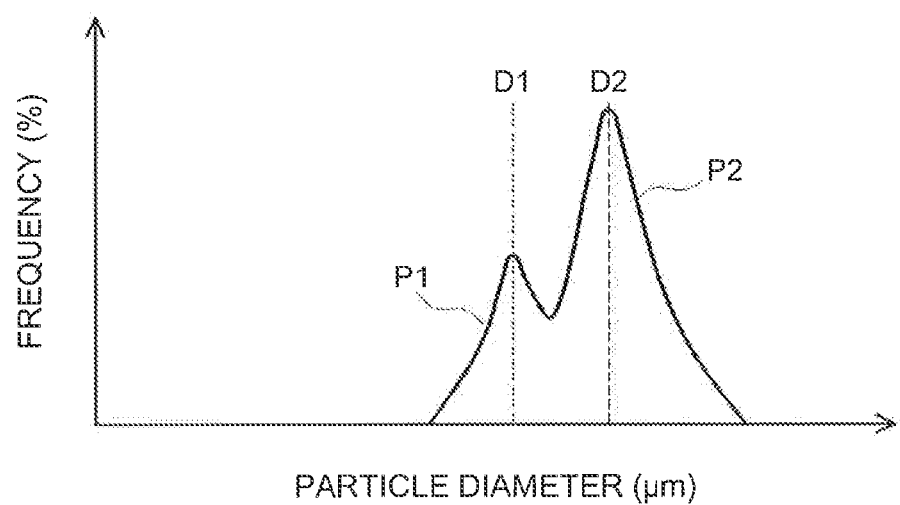
FIG. 4 is a graph illustrating the particle size distribution of an inorganic filler.
Figure 5:
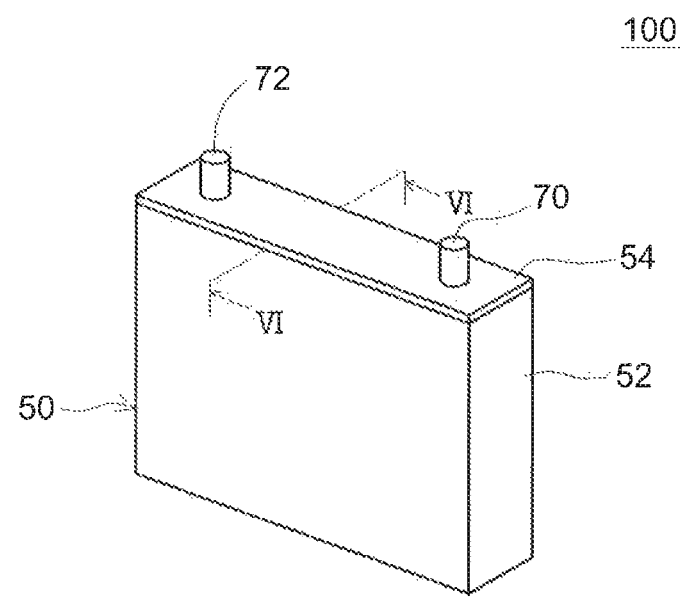
FIG. 5 is a perspective view schematically showing the appearance of a nonaqueous electrolyte secondary battery according to an embodiment of the invention.
Figure 6:
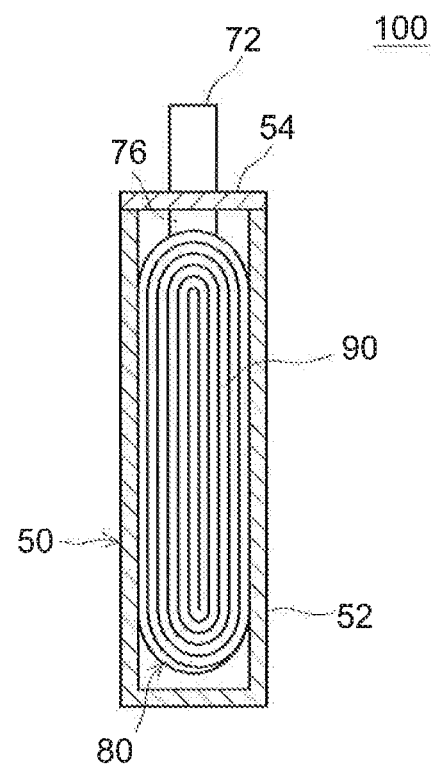
FIG. 6 is a diagram schematically showing a section taken along line VI-VI in FIG. 5.

The filler particles disclosed herein have a peak particle diameter ratio (D1/D2) which preferably satisfies the condition $D1/D2 \leq 0.7$, more preferably satisfies the condition $D1/D2 \leq 0.6$, and most preferably satisfies the condition $D1/D2 \leq 0.5$. At a particle diameter ratio (D1/D2) larger than 0.7, as shown in FIG. 4, the two peaks approach too closely to one another, as a result of which the effect arising from the presence of two peaks in the particle size distribution (i.e., the ion permeability enhancing effect of the porous heat-resistant layer) becomes inadequate, making it difficult to obtain a lithium secondary battery having a high power and a good durability. On the other hand, at a particle diameter ratio (D1/D2) that is too small, the small-diameter particles (fine particles) fill gaps between the large-diameter particles (coarse particles), which may decrease the diameter of gaps (pores) between the particles and thus narrow the flow channels for the passage of ions (leading in turn to a rise in the resistance of secondary batteries built using such a porous heat-resistant layer 42 following high-rate durability testing). From the standpoint of forming broad channels for the passage of ions, the particle diameter ratio preferably satisfies the condition $0.2 \leq D1/D2$, and more preferably satisfies the condition $0.3 \leq D1/D2$.

The particle diameter D1 of the first peak in the above particle size distribution is from about 0.2 µm to about 0.9 µm, preferably from 0.2 µm to 0.75 µm, and more preferably from 0.2 µm to 0.5 µm. At a first peak particle diameter below 0.2 µm, the particle diameter may become so small that mixture and dispersion within the porous heat-resistant layer 42 is no longer easy. The particle diameter D2 of the second peak is from about 1 µm to about 2 µm, preferably from 1.2 µm to 2 µm, and more preferably from 1.5 µm to 1.9 µm. This enables the ion permeability of the porous heat-resistant layer to be further improved, and enables the battery to achieve a higher power and improved durability.

<Average Particle Diameter>

No particular limit is imposed on the average particle diameter of the filler particles 44 disclosed herein, provided as the above particle diameter ratio (D1/D2) is satisfied. However, to stably exhibit a higher performance, the average particle size is typically in the range of 0.5 μm to 0.3 μm, and preferably 0.7 μm to 1.5 μm. For example, preferred use can be made of filler particles 44 which have an average particle diameter of from 0.5 μm to 3 μm (and more preferably 0.7 μm to 1.5 μm), and satisfy the above particle diameter ratio (D1/D2). It is preferable for the maximum particle diameter of the filler particles 44 included in the porous heat-resistant layer 42 to be generally 5 μm or less. At a maximum particle diameter greater than 5 μm, the desired effects may not be exhibited.

<Peak Intensity Ratio>

In addition, in the above particle size distribution, the peak intensity ratio between the first peak P1 having a small particle diameter and the second peak P2 having a large particle diameter is not particularly limited, provided the above particle diameter ratio (D1/D2) is satisfied. However, letting F1 (%) be the frequency of the first peak P1 and F2 (%) be the frequency of the second peak P2, the peak frequency ratio (F1/F2) preferably satisfies the condition 0.4≤F1/F2≤1.0 (and especially 0.4≤F1/F2≤0.7). Because this arrangement provides an appropriate balance in the ratio of filler particles having a large particle diameter (coarse particles) and filler particles having a small particle diameter (fine particles), the above-described effects can be more suitably achieved. It is possible, for example, to build a lithium secondary battery that undergoes little rise in resistance even with charge-discharge cycling (particularly charge-discharge cycling that includes high-rate discharge).

<BET Specific Surface Area>

It is preferable for the filler particles 44 disclosed herein to have a BET specific surface area in the range of about 1.0 m$^2$/g to about 20 m$^2$/g. Filler particles 44 which satisfy this BET specific surface area may be used in the porous heat-resistant layer 42 of the lithium secondary battery, enabling a battery that stably exhibits a higher performance to be provided. For example, a lithium secondary battery that undergoes little rise in resistance even with Charge-discharge cycling (particularly charge-discharge cycling that includes high-rate discharge) can be built. The preferred range in the BET specific surface area differs with the material, but generally is within the range of about 1 m$^2$/g to about 20 m$^2$/g, preferably from 2 m$^2$/g to 15 m$^2$/g, and most preferably from 2.5 m$^2$/g to 10 m$^2$/g, Measured values obtained by an ordinary nitrogen adsorption method may be used as the specific surface area values.

<Bulk Density>

It is suitable for the filler particles 44 disclosed herein to have a bulk density in the range of about 0.3 g/cm$^3$ to about 0.65 g/cm$^3$, and preferably from 0.35 g/cm$^3$ to 0.6 g/cm$^3$. When filler particles 44 that satisfy this bulk density are used in the porous heat-resistant layer 42 of a lithium secondary battery, a battery which stably exhibits a higher performance can be provided. For example, a lithium secondary battery which undergoes little rise in resistance even when subjected to charge-discharge cycling (particularly charge-discharge cycling that includes high-rate discharge) can be built. The loose bulk density (with no tapping), which is measured with the filler particles in a loosely packed state within the container (typically the powder in a freely fallen state), can be used as the bulk density value.

<Method of Adjusting Particle Size Distribution>

Any method may be used to adjust the particle size distribution of the filler particles 44 disclosed here, provided that the above particle diameter ratio (D1/D2) is satisfied. This may be done by, for example, mixing filler particles of differing average particle diameters. For instance, as shown in FIG. 2, first filler particles 44A having a relatively small average particle diameter and second filler particles 44B having a relatively large average particle diameter are included in the porous heat-resistant layer 42. It is desirable for the respective average particle diameters of the first filler particles 44A and the second filler particles 44B, and the mixing ratio therebetween, to be suitably selected in such a way as to enable the above particle diameter ratio (D1/D2) to be achieved in the particle size distribution of this mixture.

The first filler particles 44A and the second filler particles 44B may be made of the same type of material. For example, the first filler particles 44A and the second filler particles 4413 may both be made of alumina. Alternatively, the first filler particles 44A and the second filler particles 44B may be made of different materials. For example, the first filler particles 44A and the second filler particles 44B may be a combination of alumina and boehmite, or may be a combination of alumina and magnesia. Materials of the same type but of differing average particle diameters are typically combined, with the use of a combination of aluminas being especially preferred.

An example in which filler particles of two different particle size distributions (average particle diameters) are mixed together was indicated above as a typical example of a case in which the particle size distribution has two peaks, although the method for obtaining the porous heat-resistant layer 42 of this embodiment is not limited thereto. For instance, by subjecting filler particles having a single peak (monodispersed particles) to grinding, it is possible to impart two peaks to the particle size distribution. The particle size distribution may be adjusted by charging filler particles having a single peak (monodispersed particles) into a known grinding apparatus (e.g., a ball mill), setting the grinding conditions so as to achieve the above-indicated particle diameter ratio (D1/D2), and carrying out grinding treatment under the conditions that have been set. Adjustment in the particle size distribution may be carried out by either the above-described mixing method or the grinding method, or by a suitable combination of both.

<Binder>

In the lithium secondary battery according to this embodiment, filler particles 44 in which two peaks are present within such a particle size distribution are included together with a binder 46 in the porous heat-resistant layer 42. In cases where the subsequently described porous heat-resistant layer-forming coating contains an aqueous solvent (i.e., a solution which uses water or a mixed solvent composed primarily of water as the dispersion medium for the binder), a polymer which disperses or dissolves in the aqueous solvent may be used as the binder 46. The polymer which disperses or dissolves in the aqueous solvent is exemplified by acrylic resins. Acrylic resins that may be used include homopolymers obtained by polymerizing one type of monomer such as acrylic acid, methacrylic acid, acrylamide, methacrylamide, 2-hydroxyethyl acrylate, 2-hydroxyethyl methacrylate, methyl methacrylate, ethylhexyl acrylate and butyl acrylate. Alternatively, the acrylic resin may be a copolymer obtained by polymerizing two or more of the above monomers. It is also possible to mix together two or more of the above homopolymers and copolymers. Aside from the above-described acrylic resins, use can be made of polyolefin resins such as styrene-butadiene rubber (SBR) and polyethylene (PE), and polytetrafluoroethylene (PTFE). These polymers may be used alone as one type only or two or more may be used in combination. Of these, the use of an acrylic resin is preferred. The form of the binder is not particularly limited. That is, the binder may be used directly in the form of particles (in powder form), or it may be prepared and used in the form of a solution or an emulsion. It is also possible for two or more types of binder to be used in respectively differing forms.

Where necessary, the porous heat-resistant layer 42 may include materials other than the above-described inorganic filler 44 and binder 46. Examples of such materials include various types of polymeric materials which are capable of functioning as thickeners for the subsequently described porous heat-resistant layer-forming coating. When an aqueous solvent is used in particular, it is preferable to include a polymer that functions as the above thickener. The use of carboxymethyl cellulose (CMC) or methyl cellulose (MC) is preferred as the polymer that functions as the thickener.

Although not particularly limited, it is suitable for the inorganic particles to account for, as a proportion of the overall porous heat-resistant layer, at least about 50 mass % (e.g., from 50 mass % to 99 mass %), preferably at least 80 mass % (e.g., from 80 mass % to 99 mass %), and most preferably from about 90 mass % to about 99 mass %). Also, it is suitable for the proportion of binder in the porous heat-resistant layer 42 to be not more than about 40 mass %, preferably not more than 10 mass %, and especially not more than 5 mass % (e.g., about 0.5 mass %) to about 3 mass %). In cases where a porous heat-resistant layer-forming ingredient other than inorganic filler and binder, such as a thickener, is included, the proportion of this thickener included is preferably set to not more than about 3 mass %, and more preferably not more than about 2 mass % (e.g., from about 0.5 mass % to about 1 mass %). If the proportion of the binder is too low, the porous heat-resistant layer 42 anchoring effect and the strength (shape retention) of the porous heat-resistant layer 42 itself may decrease, possible resulting in undesirable effects such as cracking and shedding. On the other hand, if the proportion of the binder is too high, the gaps between particles in the porous heat-resistant layer 42 may be insufficient, possibly lowering the ion permeability of the porous heat-resistant layer 42 (and in turn elevating the resistance of the secondary battery built using this porous heat-resistant layer 42).

<Method of Forming Porous Heat-Resistant Layer>

Next, the method of forming the porous heat-resistant layer 42 according to this embodiment is described. A paste-like material (here and below, this includes slurry-like or ink-like materials) obtained by mixing and dispersing the inorganic filler 44 and the binder 46 in a solvent may be used as a porous heat-resistant layer-forming coating for forming the porous heat-resistant layer 42. The porous heat-resistant layer 42 can be formed by applying a suitable amount of this paste-like coating to the surface of the separator 40 (on one side of the separator 40 in this case) and then drying.

The solvent used in the porous heat-resistant layer-forming coating is exemplified by water and mixed solvents composed primarily of water. Solvents other than water that may be used in such a mixed solvent are of one, two or more types suitably selected from among organic solvents capable of uniformly mixing with water (e.g., lower alcohols, lower ketones). Alternatively, use may be made of an organic solvent such as N-methylpyrrolidone (NMP), pyrrolidone, methyl ethyl ketone, methyl isobutyl ketone, cyclohexanone, toluene, dimethylformamide and dimethylacetamide, or a combination of two or more thereof. The content of solvent in the porous heat-resistant layer-forming coating is not particularly limited, but is preferably from 40 mass % to 90 mass %, and more preferably about 50 mass %, of the overall coating.

The operation of mixing the above-described inorganic filler 44 and binder 46 in a solvent may be carried out using a suitable mixer such as a bail mill, homogenizer, Dispermill®, Clearmix®, Filmix® or ultrasonic disperser. The porous heat-resistant layer 42 can be formed by applying the porous heat-resistant layer-forming coating onto the surface of the separator 40 and then drying.

Conventional and ordinary means of application may be used without particular limitation in the operation of applying the porous heat-resistant layer-forming coating onto the surface of the separator 40. For example, application can be achieved by using a suitable coating apparatus (e.g., gravure coater, slit coater, die coater, comma coater, dip coater) to apply a suitable amount of the porous heat-resistant layer-forming coating to a uniform thickness on one side of the separator 40. The applied material is then dried by suitable drying means (typically, at a temperature lower than the melting point of the separator 40; e.g., a temperature not higher than 110° C., such as from 30° C. to 80° C.), thereby removing solvent from the porous heat-resistant layer-forming coating. By removing solvent from the porous heat-resistant layer-forming coating, a porous heat-resistant layer 42 containing hollow particles 44 and a binder 46 can be formed.

<Porosity>

Because the porous heat-resistant layer 42 thus obtained has been formed using filler particles 44 having, as described above, two peaks in the particle size distribution, which peaks have a particle diameter ratio (D1/D2) in the range of 0.2 to 0.7, the gaps between the filler particles are larger and more numerous than the gaps created between monodispersed particles. The porosity of this porous heat-resistant layer 42 is generally from 50% to 70%, preferably from 55% to 70%, and most preferably from 60% to 70%, if the porous heat-resistant layer 42 has a porosity which is too much lower than 50%, the amount of electrolyte solution that can be held within the porous heat-resistant layer 42 decreases, which may lower the ion permeability. On the other hand, if the porosity of the porous heat-resistant layer 42 has a porosity greater than 70%, the mechanical strength may be inadequate and film breakage may readily arise. For example, a porous heat-resistant layer 42 having a porosity of from 50% to 70% (and especially from 55% to 65%) is advantageous in that both ion permeability and mechanical strength are achieved. The porosity of the porous heat-resistant layer 42 can be determined from the formula $(1-W_1/\rho_1 V_1) \times 100$, where $V_1$ is the apparent volume of the porous heat-resistant layer, $W_1$ is the mass of the layer and $\rho_1$ is the true density of the materials making up the porous heat-resistant layer (i.e., the value obtained by dividing the mass $W_1$ by the sum of the solid volumes of the respective materials which contain no pores).

The average pore diameter, based on mercury porosimetry, of the porous heat-resistant layer 42 is in the range of about 0.01 to about 2.0 µm, and preferably from 0.05 µm to 1.0 µm. Such a porous heat-resistant layer 42 having a large average pore diameter and a large porosity can be advantageously used in nonaqueous electrolyte secondary batteries adapted for use in applications requiring hi power and high durability (e.g., a power supply for a hybrid vehicle or an electric vehicle).

<Thickness of Porous Heat-Resistant Layer>

The thickness of the porous heat-resistant layer 42 is preferably from about 2 μm to about 18 μm, and more preferably from about 3 μm to about 12 μm. If the thickness of the porous heat-resistant layer 42 is too large, the ion permeability of the porous heat-resistant layer 42 may decrease. On the other hand, if the thickness of the porous heat-resistant layer 42 is too small, the strength (shape retention) may decrease, possibly leading to film breakage. The thickness of the porous heat-resistant layer 42 can be determined by the image analysis of images captured by scanning electron microscopy (SEM).

<Grammage of Porous Heat-Resistant Layer>

The weight (grammage) of the porous heat-resistant layer 42 per unit surface area of the separator 40 is preferably from about 0.3 $g/cm^2$ to about 2 $g/cm^2$, and more preferably from about 0.5 $g/cm^2$ to about 1.5 $g/cm^2$. If the weight (grammage) of the porous heat-resistant layer 42 is too small, the heat shrinkage-suppressing effect of the porous heat-resistant layer 42 may diminish or the short circuit-preventing effect may decrease. On the other hand, if the weight (grammage) of the porous heat-resistant layer 42 is too large, the resistance may increase and the battery characteristics (charge-discharge characteristics, etc.) may decrease.

<Separator>

Next, the separator 40 on which the porous heat-resistant layer 42 is formed is described. Preferred use may be made of a polyolefin resin such as polyethylene or polypropylene as the separator 40 material. The separator 40 may have a single-layer construction or a multilayer construction. Here, the separator 40 is made of a polyethylene resin. A homopolymer of ethylene is preferably used as the polyethylene resin. The polyethylene resin is a resin containing at least 50 mass % of recurring units derived from ethylene, and may be a copolymer obtained by polymerizing an α-olefin copolymerizable with ethylene, or may be a copolymer obtained by polymerizing at least one type of monomer copolymerizable with ethylene. The α-olefin is exemplified by propylene. Other exemplary monomers include conjugated dimes (e.g., butadiene) and acrylic acid.

The separator 40 is preferably composed of polyethylene having a shutdown temperature of from about 120° C. to about 140° C. (typically, from about 125° C. to about 135° C.). The shutdown temperature is sufficiently lower than the heat-resistance temperature of the battery (e.g., about 200° C. or above). Examples of such polyethylenes include the polyolefins generally referred to as high-density polyethylenes and straight-chain (linear) low-density polyethylenes. Alternatively, various types of branched polyethylenes that are of medium density or low density may be used. Where necessary, additives such as various types of plasticizers and antioxidants may also be included.

A uniaxially oriented or biaxially oriented porous resin sheet may be advantageously used as the separator 40. Of these, a porous resin sheet that has been uniaxially oriented in the machine direction is especially preferred because it has a suitable strength while exhibiting little thermal shrinkage in the width direction. When a separator having a resin sheet that has been uniaxially oriented in the machine direction is used, in embodiments where such a separator has been coiled together with a positive electrode and a negative electrode that are each shaped as continuous sheets, it is possible to suppress also thermal shrinkage in the machine direction. Accordingly, a porous resin sheet that has been uniaxially oriented in the machine direction is especially preferred as one material in the separator used within such a coiled electrode assembly.

The thickness of the separator 40 is preferably from about 10 μm to about 30 μm, and more preferably from about 16 μm to about 20 μm. If the thickness of the separator 40 is too large, the ion conductivity of the separator 40 may decrease. On the other hand, if the thickness of the separator 40 is too small, film breakage may arise. The thickness of the separator 40 can be determined by the image analysis of images captured by SEM.

The porosity of the separator 40 is preferably from about 30% to about 70%, and more preferably from about 45% to about 60%. If the porosity of the separator 40 is too large, the strength may be insufficient and film breakage may arise more easily. On the other hand, if the porosity of the separator 40 is too small, the amount of electrolyte solution that can be held by the separator 40 decreases, which may lower the ion conductivity. The porosity of the separator 40 can be determined from the formula $(1-W_2/\rho_2 V_2) \times 100$, where $V_2$ is the apparent volume of the separator, $W_2$ is the mass of the separator and $\rho_2$ is the true density of the materials making up the separator (i.e., the value obtained by dividing the mass $W_2$ by the sum of the solid volumes of the respective materials which contain no pores).

The separator 40 described here has a single-layer construction composed of a polyethylene layer, although the separator 40 may instead be a resin sheet having a multilayer construction. For example, it may have a three-layer construction composed of a polypropylene layer, a polyethylene layer stacked on the polypropylene layer, and a polypropylene layer stacked on the polyethylene layer. In this case, the porous heat-resistant layer 42 may be stacked on the polypropylene layer appearing on the surface of the separator 40. The number of layers in a resin sheet having a multilayer construction is not limited to three, and instead may be two or may be four or more.

<Lithium Secondary Battery>

An embodiment of a lithium secondary battery built using two separators 40A and 40B, each having formed on one side thereof a porous heat-resistant layer 42, is described below while referring to the diagrams, although it is not the intention here to limit the invention to this embodiment. That is, so long as the above-described porous heat-resistant layer 42 and separators 40A and 40B are used, no particular limitation is imposed on the shape (exterior shape and size) of the lithium secondary battery that is built. The following embodiment is explained using, by way of illustration, a lithium secondary battery having a construction in which a coiled electrode assembly and an electrolyte solution are housed within a battery case having a prismatic shape.

FIGS. 5 to 9 schematically show the construction of a lithium secondary battery according to an embodiment of the invention. This lithium secondary battery 100 has a construction in which an electrode assembly (coiled electrode assembly) 80 in a form where a continuous positive electrode sheet 20 and a continuous negative electrode sheet 10 are stacked together with continuous separators 40A and 4013 therebetween is housed, together with a nonaqueous electrolyte 90 (FIG. 6) that has been impregnated into the electrode assembly, in a battery case 50 having a box-like shape capable of housing the coiled electrode assembly 80.

The battery case 50 has a box-like case body 52 that is open on a top end and a cover 54 which closes the opening. Preferred use may be made of a metal material such as aluminum, steel or nickel-plated stainless steel as the material making up the battery case 50. Alternatively, the battery case 50 may be molded from a resin material such as polyphenylene sulfide resin (PPS) or polyimide resin. A positive electrode terminal 72 electrically connected to the positive electrode 20 of the coiled electrode assembly 80 and a negative electrode terminal 70 electrically connected to the negative electrode 10 of the coiled electrode assembly 80 are provided on the top side (i.e., the cover 54) of the battery case 50. The coiled electrode assembly 80 is housed together with the nonaqueous electrolyte 90 at the interior of the battery case 50.

<Coiled Electrode Assembly>

Figure 7:
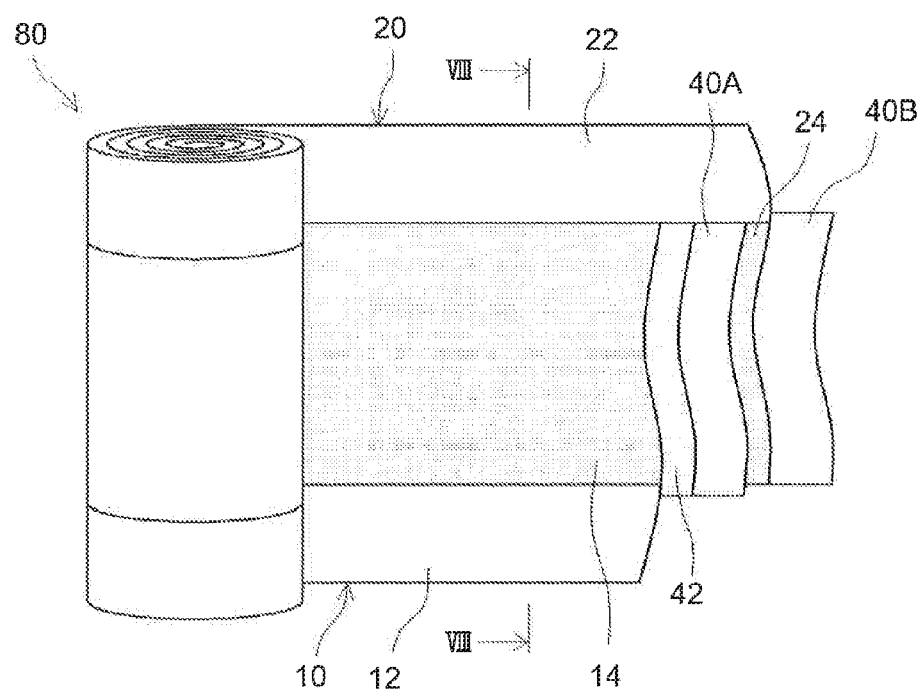
FIG. 7 is a schematic view illustrating a coiled electrode assembly used in an embodiment of the invention.

Aside from including a porous heat-resistant layer 42 containing filler particles having the above-described bimodal particle size distribution, the coiled electrode assembly 80 of this embodiment is the same as the coiled electrode assembly of a conventional lithium secondary battery and has, as shown in FIG. 7, a continuous sheet structure (sheet-like electrode assembly) in the step prior to assembly of the coiled electrode assembly 80.

<Positive Electrode Sheet>

The positive electrode sheet 20 has a structure wherein positive electrode active material layers 24 that include a positive electrode active material are held on both sides of a foil-like positive electrode current collector 22 in the form of a continuous sheet. A positive electrode active material layer-free area where the positive electrode active material layer 24 has not been deposited is formed along one edge of the positive electrode sheet 20 the upper edge portion in FIG. 7) in the width direction thereof, leaving the positive electrode current collector 22 exposed over a fixed width. Aluminum foil or some other metal foil suitable for the positive electrode is preferably used as the positive electrode current collector 22. On two or more materials which have hitherto been used in lithium secondary batteries may be used without particular limitation as the positive electrode active material. The art disclosed herein can be advantageously applied to, for example, positive electrode active materials which are composed primarily of an oxide containing as the constituent metal elements lithium and one, two or more transition metal elements (i.e., a lithium-transition metal oxide), such as lithium nickel oxides (e.g., $LiNiO_2$), lithium cobalt oxides (e.g., $LiCoO_2$) and lithium manganese oxides (e.g., $LiMn_2O_4$).

In addition to the positive electrode active material, the positive electrode active material layer 24 may optionally include one, two or more materials which are capable of being used as constituents of the positive electrode active material layer in ordinary lithium secondary batteries. Examples of such materials include conductive materials. Conductive materials that may be advantageously used include carbon materials such as carbon powders (e.g., acetylene black (AB)) and carbon fibers. Alternatively, use may be made of conductive metal powders such as nickel powder. Other materials that may be used as ingredients of the positive electrode active material layer include various types of polymer materials which are capable of serving as positive electrode active material binders (e.g., polyvinylidene fluoride (PVDF)).

<Negative Electrode Sheet>

The negative electrode sheet 10, similar to the positive electrode sheet 20, has a structure in which negative electrode active material layers 14 that include a negative electrode active material are held on both sides of a foil-like negative electrode current collector 12 in the form of a continuous sheet. A negative electrode active material layer-free area where the negative electrode active material layer 14 has not been deposited is formed along one edge of the negative electrode sheet 10 (the bottom edge portion in FIG. 7) in the width direction thereof, leaving the negative electrode current collector 12 exposed over a fixed width. Copper foil or some other metal foil suitable for the negative electrode is preferably used as the negative electrode current collector 12. One, two or more materials which have hitherto been used in lithium secondary batteries may be used without particular limitation as the negative electrode active material. Preferred examples include carbonaceous materials such as graphite carbon or amorphous carbon, lithium-transition metal oxides (e.g., lithium-titanium oxides) and lithium-transition metal nitrides.

In addition to the negative electrode active material, the negative electrode active material layer 14 may optionally include one, two or more materials which are capable of being used as constituents of the negative electrode active material layer in ordinary lithium secondary batteries. Examples of such materials include polymeric materials which are capable of serving as negative electrode active material binders (e.g., styrene-butadiene rubber (SBR)), and polymeric materials which are capable of serving as thickeners for negative electrode active material layer-forming pastes (e.g., carboxymethyl cellulose (CMC)).

Figure 8:
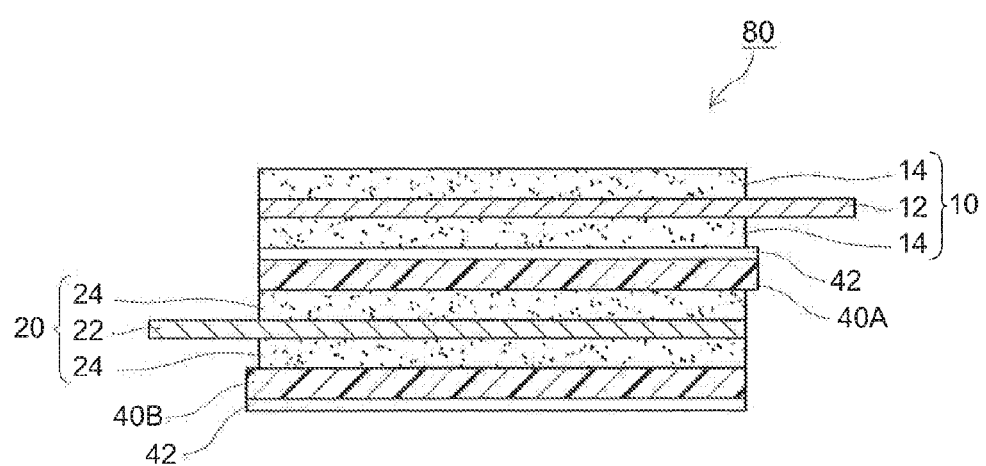
FIG. 8 is a diagram schematically showing a section taken along line VIII-VIII in FIG. 7.
Figure 9:
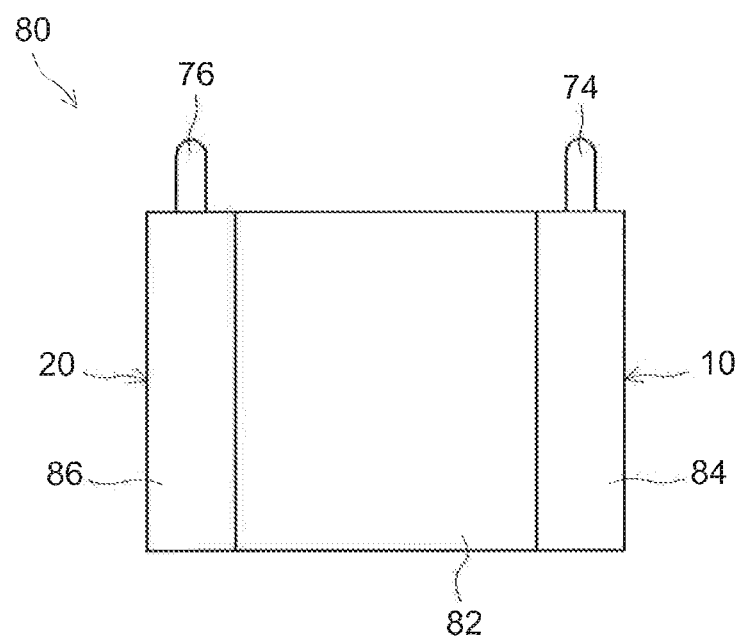
FIG. 9 is a front view schematically showing a coiled electrode assembly used in an embodiment of the invention.

When fabricating a coiled electrode assembly 80, as shown in FIGS. 7 and 8, the separator 40B, the positive electrode sheet 20, the separator 40A and the negative electrode sheet 10 are stacked as successive layers. At this time, the positive electrode sheet 20 and the negative electrode sheet 10 are arranged over each other with the positive electrode sheet 20 and the negative electrode sheet 10 somewhat offset in the width direction, such that the positive electrode active material layer-free portion of the positive electrode sheet 20 and the negative electrode active material layer-free portion of the negative electrode sheet 10 respectively protrude out from both sides of the separators 40A and 40B in the width direction thereof. At this time, the separator 40A sandwiched between the positive electrode sheet 20 and the negative electrode sheet 10 is positioned such that the porous heat-resistant layer 42 formed on one side of this separator 40A faces the negative electrode sheet 10. In addition, the separator 40B arranged on the bottom side of the positive electrode sheet 20 is positioned such that the porous heat-resistant layer 42 formed on one side of this separator 40B faces the side opposite to the positive electrode sheet 20 (so as to appear on the surface of the stack). The coiled electrode assembly 80 can be fabricated by thus arranging the separator 40B, the positive electrode sheet 20, the separator 40A and the negative electrode sheet 10 over each other, and coiling these sheets 10, 20, 40A and 40B in the machine direction thereof while applying tension to each sheet.

A coiled core portion 82 (i.e., the portion where the positive electrode active material layer 24 of the positive electrode sheet 20, the negative electrode active material layer 14 of the negative electrode sheet 10, and the separators 40A and 4013 have been tightly stacked) is formed at the center portion in the direction of the coiling axis for the coiled electrode assembly 80. In addition, the electrode active material layer-free portions of the positive electrode sheet 20 and the negative electrode sheet 10 respectively protrude outward from the coiled core portion 82 at both ends of the coiled electrode assembly 80 in the direction of the coiling axis. A positive electrode current collecting plate 76 and a negative electrode current collecting plate 74 are additionally provided at, respectively, the positive electrode side protruding portion (that is, the portion on which the positive electrode active material layer 24 has not been formed) 86 and the negative electrode side protruding portion (the portion on which the negative electrode active material layer 14 has not been formed) 84, and are electrically connected to, respectively, the above-mentioned positive electrode terminal 72 and negative electrode terminal 70.

<Nonaqueous Electrolyte>

Next, the coiled electrode assembly 80 is inserted into the case body 52 through the opening at the top of the case body 52, along with which a suitable nonaqueous electrolyte 90 is placed within (poured into) the case body 52. This nonaqueous electrolyte has a composition which typically includes a suitable nonaqueous solvent and a supporting salt. Examples of nonaqueous solvents that may be used include ethylene carbonate (EC), ethyl methyl carbonate (EMC), dimethyl carbonate (DMC), diethyl carbonate (DEC) and propylene carbonate (PC). Examples of supporting salts that may be advantageously used include $LiPF_6$, $LiBF_4$, $LiAsF_6$ and $LiCF_3SO_3$.

The opening is then sealed such as by welding the cover 54 to the case body 52, thereby completing assembly of the lithium secondary battery 100 according to this embodiment. The sealing process for the case 50 and the process of adding (pouring) the electrolyte may be the same as in methods carried out in the fabrication of conventional lithium secondary batteries, and are not essential features of the invention. This completes the construction of the lithium secondary battery 100 according to this embodiment.

In the lithium secondary battery 100 built as described above, because the porous heat-resistant layer 42 has a high ion permeability, the battery exhibits an excellent battery performance. For example, a battery which is endowed with at least excellent high-rate characteristics or an excellent durability (and preferably both) can be provided.

Test examples relating to this invention are described below, although it is not the intention here to limit the invention to the embodiments shown in the following test examples. In these test examples, porous heat-resistant layers were formed on the separator surfaces using inorganic filler powders having two peaks present in the particle size distribution, each of the inorganic filler powders having a differing particle diameter ratio (D1/D2) between the peaks. In addition, test batteries were fabricated using these porous heat-resistant layer-bearing separators. High-rate cycle tests was carried out using these test batteries, and the influence of the peak particle diameter ratio (D1/D2) on battery performance was evaluated. The particle size distribution of the inorganic filler powder was measured using a Microtrac particle size analyzer (MT 3300EX) from Nikkiso Co., Ltd.

<Samples 1 to 13>

[Porous Heat-Resistant Layer-Bearing Separators]

In these examples, alumina powders having two peaks present in the particle size distribution and having respectively differing peak particle diameter ratios (D1/D2) between those peaks were furnished for use. Table 1 shows the results of particle size distribution measurements for the alumina powders used in the respective samples. In samples 2, 3, 9 and 11, the particle size distribution was imparted with two peaks by the method of mixing together alumina powders having different average particle diameters. In Samples 1, 4 to 8 and 10, the particle size distribution was imparted with two peaks by the method of grinding a monodispersed alumina powder. For the sake of comparison, in Samples 12 and 13, monodispersed alumina powders having a single peak were used.

The above alumina powders, an acrylic polymer as the binder and CMC as the thickener were mixed together with NMP so as to give a mass ratio for these materials, expressed as the solids ratio, of 96:4, and dispersion was carried out with a media-less high-speed stirring disperser (Clearmix, from M Technique Co., Ltd.), thereby preparing a porous heat-resistant layer-forming coating. The dispersion times were set to 5 minutes at 15,000 rpm (preliminary dispersion) and 1 minutes at 20,000 rpm (main dispersion). The resulting porous heat-resistant layer-forming coatings were applied with a gravure roll to one side of a separator (a separator having a thickness of 20 μm and a PP/PE/PP three-layer construction was used) and then dried, thereby producing porous heat-resistant layer-bearing separators for Samples 1 to 13 which consisted of a porous heat-resistant layer formed on one side of a separator. The thickness of the porous heat-resistant layer was set to 5 μm.

Lithium secondary batteries for testing were fabricated using the resulting porous heat-resistant layer-bearing separators according to Samples 1 to 13. The lithium secondary batteries for testing were fabricated as described below.

[Positive Electrode Sheet]

A positive electrode active material layer-forming paste was prepared by mixing $LiNi_{1/3}Co_{1/3}Mn_{1/3}O_2$ powder as the positive electrode active material and AB (conductive material) and PVDF (binder) together with NMP so as to set the mass ratio of these materials to 85:10:5. This positive electrode active material layer-forming paste was coated in the form of a band onto both sides of a 15 μm thick continuous aluminum foil (positive electrode current collector) and dried, thereby producing a positive electrode sheet composed of a positive electrode current collector provided on each side with a positive electrode active material layer. The amount of positive active material layer-forming paste applied was adjusted to about 10.2 mg/cm$^2$ (solids basis) for both sides combined.

[Negative Electrode Sheet]

A negative electrode active material layer-forming paste was prepared by mixing together a graphite powder as the negative electrode active material, SBR and CMC so as to set the mass ratio of these materials to 98:1:1. This negative electrode active material layer-forming paste was coated onto both sides of a 10 μm thick continuous copper foil (negative electrode current collector) and dried, thereby producing a negative electrode sheet composed of a negative electrode current collector provided on each side with a negative electrode active material layer. The amount of negative active material layer-forming paste applied was adjusted to about 7.5 mg/cm$^2$ (solids basis) for both sides combined.

[Lithium Secondary Battery]

Next, the positive electrode sheet and the negative electrode sheet were stacked together with two porous heat-resistant layer-bearing separators therebetween. In the separator sandwiched between the positive electrode sheet and the negative electrode sheet, the porous heat-resistant layer formed on one side of the separator was arranged so as to face the negative electrode sheet. In the separator placed on the bottom side of the positive electrode sheet, the porous heat-resistant layer formed on one side of the separator was arranged so as to face the side opposite from the positive electrode sheet (i.e., so as to appear on the surface of the stack). Next, the stack was coiled, and the coiled body was laterally pressed and flattened, thereby producing a coiled electrode assembly having a flattened shape. This coiled electrode assembly was placed together with a nonaqueous electrolyte solution in a box-like battery case, and the opening in the battery case was airtightly sealed. A solution obtained by dissolving $LiPF_6$ as the supporting salt to a concentration of about 1 mol/L in a mixed solvent containing EC, EMC and DEC in a volumetric ratio of 1:1:1 was used as the nonaqueous electrolyte solution. Following assembly of the lithium secondary battery in this way, initial charge-discharge treatment (conditioning) was carried out in the usual manner, giving a lithium secondary battery for testing. This lithium secondary battery had a rated capacity of 800 mAh.

[High-Rate Cycle Test]

The lithium secondary batteries for testing in the respective samples thus obtained were subjected to charge-discharge cycle testing that involved applying a charge-discharge pattern of repeated high-rate pulse discharge at 5° C. for 10 seconds. Specifically, 5,000 charge-discharge cycles were continuously repeated, with each cycle consisting of, in a −15° C. environment, carrying out high-rate pulse discharge at 5° C. for 10 seconds, charging at 1° C. to a voltage corresponding to a state of charge (SOC) of 50%, then carrying out charging at this voltage value to a total charging time of 2 hours. The high-rate deterioration ratio was determined from the IV resistance prior to the above-described charge-discharge cycle test (initial IV resistance of lithium secondary battery) and the IV resistance after the charge-discharge cycle test; that is, high-rate deterioration ratio=[IV resistance after charge-discharge cycle test/IV resistance before charge-discharge cycle test]. To obtain the IV resistances before and after the charge-discharge cycle test, the battery in each case was adjusted to a SOC of 60%, constant-current (CC) discharge was carried out at 10° C. for 10 seconds, and the resistance was determined from the slope of the first-order linear approximation for the current (I)—voltage (V) plot values. Here, 1 C refers to the amount of current at which the rated capacity can be discharged in one hour. The results are shown in Table 1 and FIG. 10. It can be concluded that, as the high-rate deterioration ratio becomes larger, the performance undergoes marked deterioration with repeated high-rate discharge.

ratio of 1.2 or less was obtained, resulting in a better high-rate durability. Even better results were obtained at peak particle diameter ratios (D1/D2) of from 0.2 to 0.5.

Figure 10:
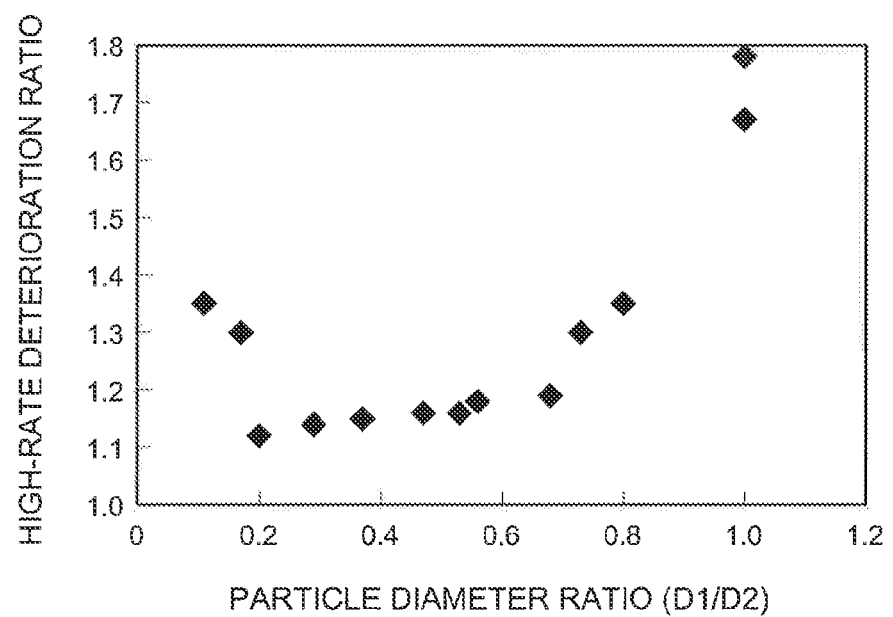
FIG. 10 is a graph showing the relationship between peak particle diameter ratio (D1/D2) and high-rate deterioration ratio.

At the same time, from Table 1 and FIG. 10, although the batteries in Samples 1 and 2 in which the peak particle diameter ratio (D1/D2) was less than 0.2 each had a porosity of at least 65%, the high-rate durability was lower than in Samples 3 to 9. This is thought to be caused by the fact that, because the peak particle diameter ratios (D1/D2) in Samples 1 and 2 were made too small, particles having a small particle diameter (fine particles) packed into the gaps between particles having a large particle diameter (coarse particles), which reduced the diameter of the pores, making the flow channels for passage of the ions narrower. From the standpoint of forming broad flow channels for the passage of ions, it is preferable to have the peak particle diameter ratio (D1/D2) be 0.2 or more.

The bulk densities and BET specific surface areas of the alumina powders used in the respective samples are shown in Table 2. Evaluating the properties of the samples from a different perspective, it is suitable for the bulk density of the alumina powder to be from about 0.3 $g/cm^3$ to about 0.65 $g/cm^3$, and preferably from 0.35 $g/cm^3$ to 0.65 $g/cm^3$. By using alumina powder having a bulk density in this range, a very small high-rate deterioration ratio of 1.2 or below can be achieved. It is suitable for the BET specific surface area to be from about 2 $m^2/g$ to about 10 $m^2/g$, and preferably from 3 $m^2/g$ to 9 $m^2/g$.

TABLE 1

| | Particle diameter D1 of first peak (μm) | Particle diameter D2 of second peak (μm) | Particle diameter ratio D1/D2 | Frequency ratio F1/F2 | Average particle diameter (μm) | Porosity (%) | High-rate deterioration ratio |
|---|---|---|---|---|---|---|---|
| Sample 1 | 0.1 | 0.9 | 0.11 | 0.72 | 0.67 | 67.8 | 1.35 |
| Sample 2 | 0.2 | 1.2 | 0.17 | 0.75 | 0.82 | 65.3 | 1.3 |
| Sample 3 | 0.2 | 1 | 0.20 | 0.47 | 0.80 | 62.1 | 1.12 |
| Sample 4 | 0.35 | 1.2 | 0.29 | 0.59 | 0.86 | 55.7 | 1.14 |
| Sample 5 | 0.7 | 1.9 | 0.37 | 0.45 | 1.50 | 58.4 | 1.15 |
| Sample 6 | 0.7 | 1.5 | 0.47 | 0.69 | 1.10 | 53.7 | 1.16 |
| Sample 7 | 0.8 | 1.5 | 0.53 | 0.70 | 1.39 | 52.6 | 1.16 |
| Sample 8 | 0.9 | 1.6 | 0.56 | 0.66 | 1.33 | 51.4 | 1.18 |
| Sample 9 | 0.75 | 1.1 | 0.68 | 0.65 | 0.83 | 50.2 | 1.19 |
| Sample 10 | 1.1 | 1.5 | 0.73 | 0.53 | 0.44 | 47.0 | 1.3 |
| Sample 11 | 0.4 | 0.5 | 0.80 | 0.46 | 1.40 | 42.3 | 1.35 |
| Sample 12 | 0.3 | | 1.00 | — | 0.3 | 40.3 | 1.67 |
| Sample 13 | 0.7 | | 1.00 | — | 0.7 | 36.2 | 1.78 |

As is apparent from Table 1 and FIG. 10 the batteries of Samples 12 and 13 wherein a alumina powder composed of monodispersed particles was used had a large rise in resistance when subjected to a low-temperature high-rate cycle test, and thus had a poor high-rate durability. By contrast, in the batteries of Samples 3 to 9 wherein the alumina powder had two peaks in the particle size distribution and the peak particle diameter ratio (D1/D2) was set to from 0.2 to 0.7, the porosity was higher (about 50% to about 65%) than in Samples 12 and 13 and a very low high-rate, deterioration

TABLE 2

| | Bulk density ($g/cm^3$) | BET specific surface area ($m^2/g$) | Porosity (%) | High-rate deterioration ratio |
|---|---|---|---|---|
| Sample 1 | 0.27 | 7.9 | 67.8 | 1.35 |
| Sample 2 | — | 8.9 | 1.8 | 65.3 | 1.3 |

TABLE 2-continued

| | Bulk density ($g/cm^3$) | BET specific surface area ($m^2/g$) | Porosity (%) | High-rate deterioration ratio |
|---|---|---|---|---|
| Sample 3 | — | 8.9 | 2.5 | 62.1 | 1.12 |
| Sample 4 | 0.45 | 4.5 | 55.7 | 1.14 |
| Sample 5 | 0.44 | 5.7 | 58.4 | 1.15 |
| Sample 6 | 0.46 | 4.4 | 53.7 | 1.16 |
| Sample 7 | 0.53 | 3.5 | 52.6 | 1.16 |

TABLE 2-continued

|  | Bulk density (g/cm³) | BET specific surface area (m²/g) | | Porosity (%) | High-rate deterioration ratio |
|---|---|---|---|---|---|
| Sample 8 | 0.60 | 2.9 | | 51.4 | 1.18 |
| Sample 9 | — | 2.75 | 2.3 | 50.2 | 1.19 |
| Sample 10 | — | 4.4 | 3.3 | 47.0 | 1.3 |
| Sample 11 | 0.82 | 1.1 | | 42.3 | 1.35 |
| Sample 12 | 0.70 | 5.6 | | 40.3 | 1.67 |
| Sample 13 | 0.80 | 2.7 | | 36.2 | 1.78 |

<Samples 14 and 15>

Aside from forming a porous heat-resistant layer on the surface of the negative electrode sheet (negative electrode active material layer) and setting the particle size distributions and characteristics of the alumina powders used as shown in Tables 3 and 4, the lithium secondary batteries of Samples 14 and 15 were built in the same way as in Samples 1 to 13. The high-rate deterioration ratios were evaluated in the same way as for Samples 1 to 13. The results are shown in Tables 3 and 4.

As shown in Tables 3 and 4, the batteries of Samples 14 and 15 in which a porous heat-resistant layer was formed on the surface of the negative electrode sheet, even though the peak particle diameter ratio (D1/D2) was set to from 0.2 to 0.7, each had a low porosity and a poor high-rate durability compared with the batteries in Samples 3 to 9 (Table 1). It is apparent from this that the improvement in the high-rate characteristics attributable to setting the peak particle diameter ratio (D1/D2) to from 0.2 to 0.7 is exhibited most effectively when the porous heat-resistant layer is formed on the surface of the separator.

<Samples 16 and 17>

Aside from using magnesia powder and boehmite powder as the inorganic filler and setting the particle size distributions and characteristics of the inorganic filler powders used as shown in Tables 3 and 4, the lithium secondary batteries of Samples 16 and 17 were built in the same way as in Samples 1 to 13. The high-rate deterioration ratios were evaluated in the same way as for Samples 1 to 13. The results are shown in Tables 3 and 4.

As shown in Tables 3 and 4, the batteries of Samples 16 and 17 in which magnesia and boehmite were used as the inorganic fillers, much as in Samples 1 to 13 (Table 1) in which alumina powder was used, had a high porosity (about 50% to about 65%) and exhibited a very low high-rate deterioration ratio of 1.2 or less, and thus possessed an excellent high-rate durability. From these results, the inorganic filler material is not limited to alumina, with the broad application of inorganic compounds in general, such as magnesium and boehmite, being possible.

TABLE 4

|  | Average particle diameter (μm) | Bulk density (g/cm³) | BET specific surface area (m²/g) | Porosity (%) | High-rate deterioration ratio |
|---|---|---|---|---|---|
| Sample 14 | 0.86 | 0.45 | 4.5 | 48.2 | 1.23 |
| Sample 15 | 1.39 | 0.53 | 3.5 | 47.6 | 1.28 |
| Sample 16 | 0.71 | 0.35 | 12.8 | 63.2 | 1.16 |
| Sample 17 | 0.9 | 0.50 | 9.1 | 55 | 1.14 |

The art disclosed herein is able to provide a nonaqueous electrolyte secondary battery having a positive electrode, a negative electrode, a separator interposed between the positive electrode and the negative electrode, and a nonaqueous electrolyte solution, and further having a porous heat-resistant layer disposed between the separator and at least one electrode from among the positive electrode and the negative electrode, wherein the porous heat-resistant layer includes an inorganic filler and a binder, the inorganic filler included in the porous heat-resistant layer having a particle size distribution with two peaks: a first peak at a relatively small particle diameter and a second peak at a relatively large particle diameter, such that, letting D1 be the particle diameter of the first peak and D2 being the particle diameter of the second peak, the peak particle diameter ratio (D1/D2) satisfies the condition $0.2 \leq D1/D2 \leq 0.7$, which battery, when subjected to 5,000 continuously repeated cycles, each cycle consisting of, in a −15° C. environment, carrying out high-rate pulse discharge at 5 ° C. for 10 seconds, charging at 1° C. to a voltage corresponding to a SOC of 50%, then carrying out charging at this voltage value to a total charging time of two hours, is characterized by having a high-rate deterioration ratio, as determined from the IV resistance after this durability test and the IV resistant before the durability test (initial IV resistance), of 1.2 or less (preferably 1.15 or less). Here, the IV resistances before and after the high-rate durability test are obtained by, at a temperature of 25° C. or below, adjusting the nonaqueous electrolyte secondary battery to a SOC of 60%, carrying out constant-current (CC) discharge at 10 ° C. for 10 seconds, and calculating the IV resistance from the slope of the first-order linear approximation for the current (I) voltage (V) plot values. The high-rate deterioration ratio is determined from [IV resistance after charge-discharge cycle test/initial IV resistance]. A nonaqueous electrolyte secondary battery which satisfies the above high rate deterioration ratio and has an initial IV resistance of 50 mΩ or less (more preferably, 40 mΩ or less) is more preferred.

The invention has been described in detail above by way of preferred embodiments and examples, although these descriptions are not intended to be limitative, various modifications and changes to the foregoing embodiments and examples being of course possible. For instance, the type of battery is not limited to the above-described lithium sec-

TABLE 3

|  | Coating carried out on | Filler | First peak particle diameter D1 (μm) | Second peak particle diameter D2 (μm) | Particle diameter ratio D1/D2 | Frequency ratio F1/F2 | Porosity (%) | High-rate deterioration ratio |
|---|---|---|---|---|---|---|---|---|
| Sample 14 | negative electrode | alumina | 0.35 | 1.2 | 0.29 | 0.59 | 48.2 | 1.23 |
| Sample 15 | negative electrode | alumina | 0.8 | 1.5 | 0.53 | 0.70 | 47.6 | 1.28 |
| Sample 16 | separator | magnesia | 0.4 | 1.0 | 0.4 | 0.65 | 63.2 | 1.16 |
| Sample 17 | separator | boehmite | 0.4 | 1.1 | 0.36 | 0.54 | 55 | 1.14 | ondary battery, and may be batteries of various composition that include differing electrolyte assembly materials and electrolytes, such as nickel hydride batteries, nickel cadmium batteries and electrical double layer capacitors.

So tong as use is made of the porous heat-resistant layer containing the inorganic filler disclosed herein, the shape (exterior shape and size) of the nonaqueous electrolyte secondary battery that is built is not subject to any particular limitation. The battery may be one in which the outer enclosure is a thin sheet-type housing composed of a laminate film or the like, one in which the battery outer case has a cylindrical or rectangular shape, or one having a small button shape.

The above-described examples illustrate cases in which the porous heat-resistant layer is formed on one surface of the separator that is situated on the side thereof facing the negative electrode, although the invention is not limited in this regard. The porous heat-resistant layer may be formed on one surface of the separator that is situated on the side thereof facing the positive electrode. Or the porous heat-resistant layer may be formed on both surfaces of the separator.

INDUSTRIAL APPLICABILITY

This invention provides a nonaqueous electrolyte secondary battery having excellent high-rate characteristics and a good durability.

Figure 11:
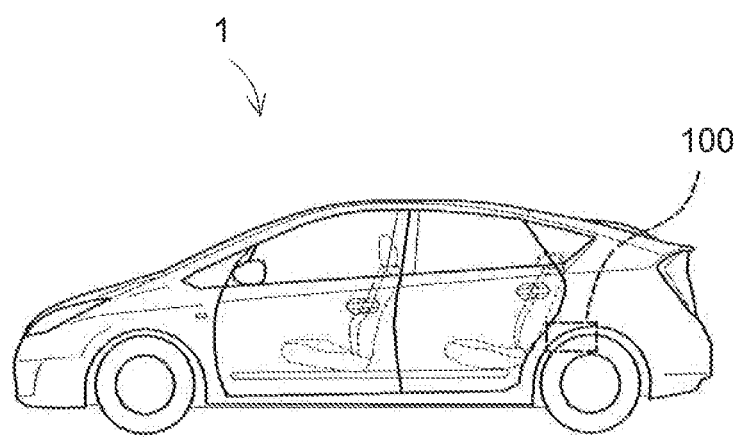
FIG. 11 is a side view schematically showing a vehicle with nonaqueous electrolyte secondary batteries on board.

Any of the nonaqueous electrolyte secondary batteries 100 disclosed herein has a performance suitable as a battery to be installed in a vehicle (a nonaqueous electrolyte secondary battery for use as a power source for driving a vehicle). Therefore, according to this invention, as shown in FIG. 11, there is provided a vehicle 1 having any one of the nonaqueous electrolyte secondary batteries 100 disclosed herein. In particular, a vehicle 1 (e.g., an automobile) having this nonaqueous electrolyte secondary battery 100 as the power source (typically, the power source for a hybrid vehicle or an electric vehicle) is provided.

The invention claimed is:

1. A nonaqueous electrolyte secondary battery comprising a positive electrode, a negative electrode, a separator interposed between the positive electrode and the negative electrode, and a nonaqueous electrolyte solution, the battery further comprising a porous heat-resistant layer disposed between the separator and at least one of the positive electrode and the negative electrode, wherein the porous heat-resistant layer includes an inorganic filler and a binder, the inorganic filler included in the porous heat-resistant layer has a particle size distribution with two peaks, which are a first peak at a relatively small particle diameter and a second peak at a relatively large particle diameter, when the particle diameter of the first peak is D1 and the particle diameter of the second peak is D2, the peak particle diameter ratio D1/D2 satisfies the condition $0.2 \leq D1/D2 \leq 0.7$, the particle diameter D1 of the first peak is from 0.2 μm to 0.9 μm, the particle diameter D2 of the second peak is from 1 μm to 1.9 μm, the average particle size of the filler particles is in the range of 0.8 μm to 1.5 μm, when a frequency of the first peak is F1 (%) and a frequency of the second peak is F2 (%), the peak frequency ratio F1/F2 satisfies the condition $0.45 \leq F1/F2 \leq 0.7$, and the porous heat-resistant layer has a porosity of 50.2% to 62.1%.

2. The nonaqueous electrolyte secondary battery according to claim 1, wherein the inorganic filler included in the porous heat-resistant layer has a maximum particle diameter of 5 μm or less.

3. The nonaqueous electrolyte secondary battery according to claim 1, wherein the porous heat-resistant layer is formed on a surface of the separator situated on a side thereof facing the negative electrode.

4. The nonaqueous electrolyte secondary battery according to claim 1, wherein the inorganic filler is composed of at least one type of inorganic compound selected from the group consisting of alumina, magnesia, zirconia, silica, boehmite and titania.

5. The nonaqueous electrolyte secondary battery according to claim 1, wherein a BET specific surface area of the filler particle is within the range of 1 $m^2/g$ to 20 $m^2/g$, a bulk density of the filler particle is within 0.3 $g/cm^3$ to about 0.65 $g/cm^3$, the average pore diameter of the porous heat-resistant layer is in the range of 0.01 μm to 2.0 μm, and the grammage of the porous heat-resistant layer is from 0.3 $g/cm^2$ to 2 $g/cm^2$.

* * * * *